Patented Apr. 11, 1944

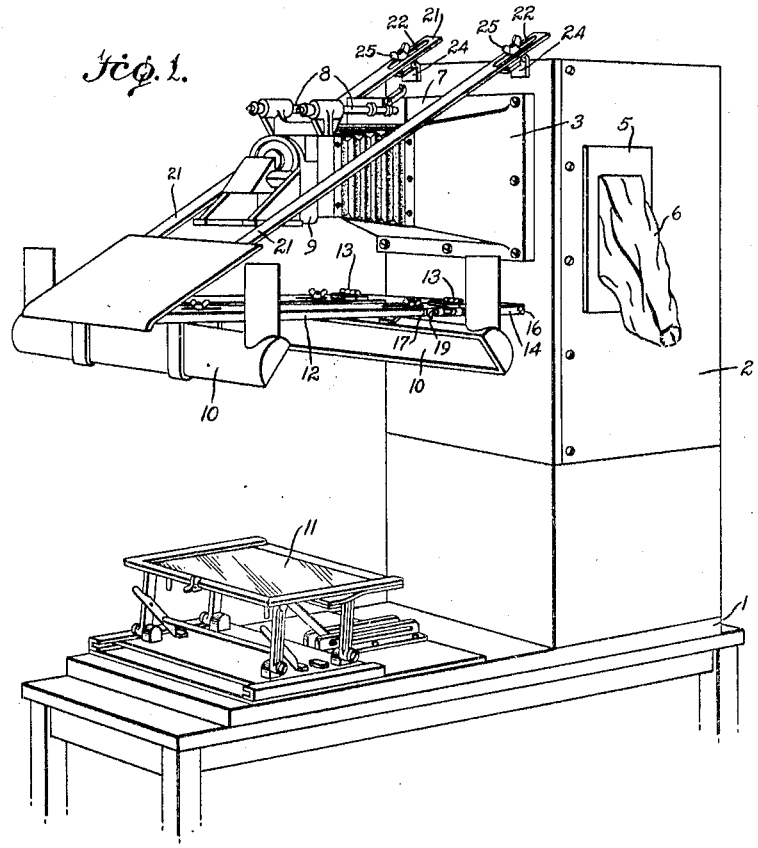

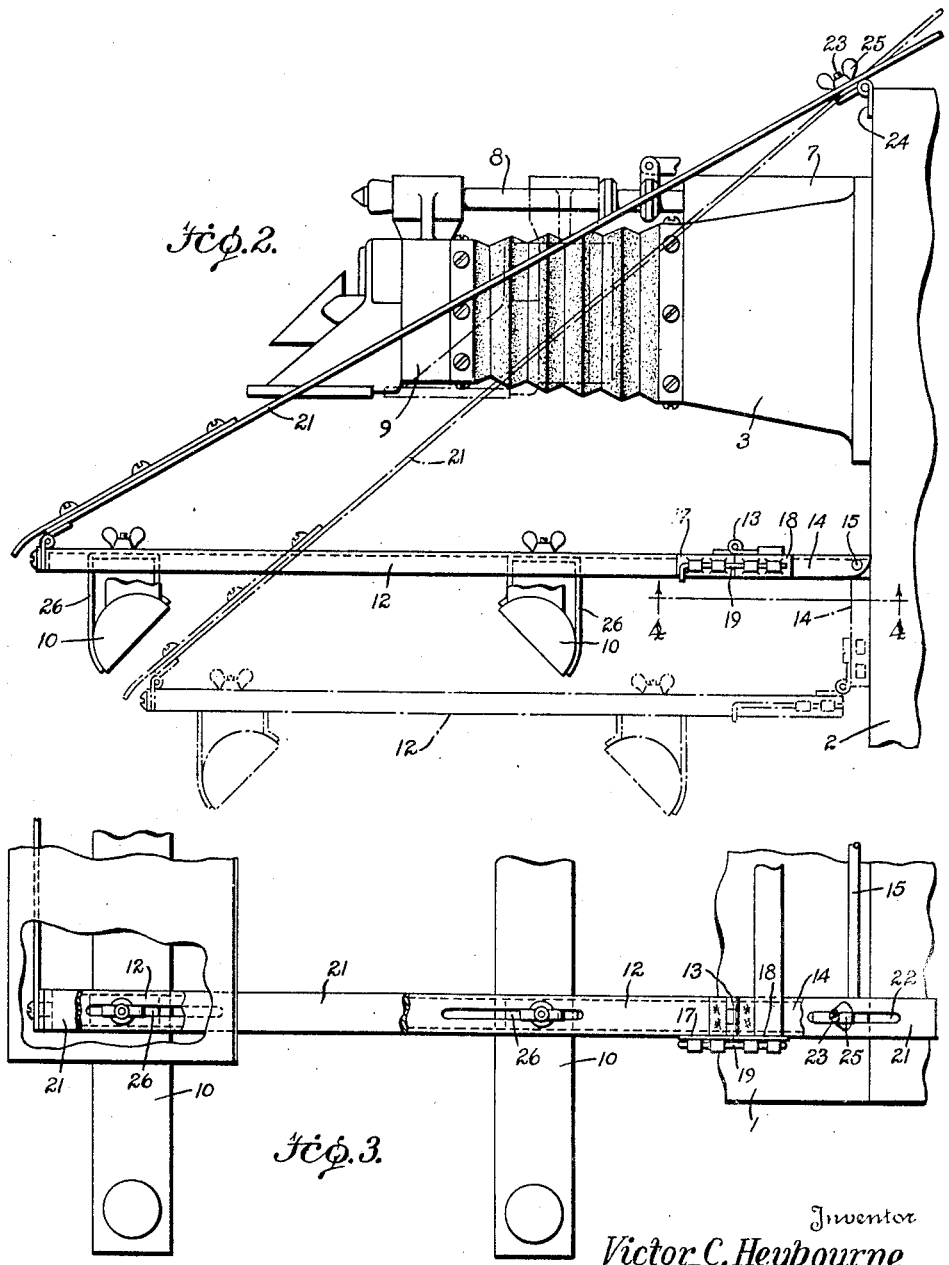

2,346,217

UNITED STATES PATENT OFFICE 2,346,217

LIGHT SUPPORT FOR DOCUMENT PHOTOGRAPHING CAMERAS

Victor C. Heybourne, Tonawanda, N. Y., assignor to Remington Rand Inc., Buffalo, N. Y.

Original application July 3, 1940, Serial No. 343,803. Divided and this application January 9, 1943, Serial No. 471,814

4 Claims. (Cl. 240—1.3)

This invention relates to cameras for photographing documents and particularly to a structure for supporting the lights for illuminating the documents during photography.

This application is a division of application Ser. No. 343,803 filed July 3, 1940, Patent No. 2,323,600, patented July 6, 1943.

The invention comprehends the provision of means for making fixed adjustments of the focusing mechanism, the copyholder and the ligths in a document photographing camera so that documents of different size may be reproduced in uniform size or different size, as desired.

The invention also comprehends the provision of a light supporting structure that may be quickly operated for moving the lights for photographing a document into different positions corresponding to the positions of the photographing unit and copyholder for obtaining the desired uniform light intensity but eliminating reflection of the incident rays into the photographing unit.

In the drawings:

Fig. 1 shows a camera mounted on a table in perspective.

Fig. 2 is an enlarged side elevation of a portion of the camera showing the frame structure carrying the lighting means in one position in full lines and in adjusted position in dot and dash lines.

Fig. 3 is a fragmentary top plan view of one side of the light supporting frame as shown in Fig. 2 with portions broken away and shown in cross section.

Fig. 4 is a cross section taken on line 4—4 of Fig. 2.

It will be noted that the present invention is an improvement over the camera disclosed in Patent No. 2,042,005, patented May 26, 1936, particularly with respect to the provision of an adjustable mounting structure for the lights in order that the lights may be arranged in two or more different planes to correspond with the various adjusted positions of the photographic unit and copyholder so that the camera of the present invention may be adapted to photographing documents of different size and of different degrees of reduction or enlargement.

The camera has a base 1 on one end of which is mounted a housing 2 as shown in Fig. 1. These parts may preferably be constructed in the manner described and shown in the aforementioned patent and application.

A supporting tube 3 is mounted on casing 2 at the upper end of one side wall thereof and projects over the free end of base 1. Supporting tube 3 extends through an opening in casing 2 and supports a holding frame on the inner end within casing 2 that may be constructed and mounted in the manner disclosed in the above-mentioned application and patent.

Housing 2 is provided for the purpose of housing a supply of sensitized sheets that may be placed in the holding frame during the photographing of documents. Housing 2 is light tight and access is provided to the housing for handling sensitized paper to place it in the holding frame and remove it therefrom after being photographed, through the medium of a door 5 mounted in a side wall of casing 2. Door 5 is provided with a flexible sleeve 6 to receive the arm of an operator in such a manner that light will not be admitted to the interior of casing 2 during the operation of the camera.

Supporting tube 3 is constructed in the manner referred to in the aforementioned patent and application and the holding frame is mounted on the end of the tube as described in the aforementioned patent and application so that the sensitized surface of paper sheets on which duplicate photographic copies are to be made are held in the focal plane of the photographic unit.

Supporting tube 3 is provided with a projection 7, not shown in the above-mentioned patent, carrying a pair of spaced parallel rods 8 extending over the free end of base 1 beyond the end of supporting tube 3 for slidably supporting photographic unit 9. Suitable means for limiting the sliding movement of photographic unit 9 with respect to housing 2 are provided in order to control the adjustment of photographic unit 9 so that it may be positioned in any one of three fixed positions of adjustment for making photographic reproductions of documents carried by a copyholder on base 1 in any of the three positions of adjustment in a manner fully described and claimed in the aforementioned application Serial No. 343,803.

Photographic unit 9 includes a housing structure that mounts a prism for reflecting light from the document through a lens and shutter mechanism carried by the unit for focusing upon the surface of sensitized paper carried in the holding frame. This is disclosed in the aforementioned application describing how lens unit 9 may be mounted in any one of three different positions of adjustment and retained in such adjusted position. The copyholder carried by base 1 is also adapted for adjustment into three positions corresponding with the three positions of adjustment of the lens unit so that when the copyholder and lens unit are in their corresponding positions, three different sizes of photographic reproductions may be made from the same document carried by the copyholder, three different sized documents may be photographed to produce a photographic reproduction of uniform size in the manner described in said application Ser. No. 343,803.

The camera is provided with a source of light for lighting a document to be photographed and it is found desirable to have the light in each adjusted position of the copyholder and photographing unit of the same intensity in order to obtain uniform photographic reproductions of documents for each of the three positions in which photographs may be made. The invention provides a source of light for photographing documents that is adjustably mounted on a supporting structure that forms the feature of invention of the present application and will now be specifically described.

With the copyholder and photographic unit having three positions of adjustment as referred to above and described in the aforementioned application, it will be understood that the illuminating means for the documents will have three different positions corresponding to the three positions for the adjustment of the copyholder plate and photographic unit. The means for illuminating documents on the copyholder plate are shown in Fig. 1 in perspective as well as the other figures of the drawings, and to illustrate in Fig. 1 the position of the light support for illuminating documents in the position of adjustment where the photographing unit 9 is at the outer end or limit of movement on rods 8 and the copyholder is at the upper limit of its movement on the supporting links therefor. This position of the light support is also illustrated in Fig. 2 in full lines while the position of the photographic unit and the light supporting structure is at the opposite limit of movement in the illustrations shown in dot and dash lines in Fig. 2. The lamp housings may be slidably adjusted to opposite ends of the slots in the supporting rails in the position shown in Figs. 1 and 2 in full lines for illuminating documents in two different positions of the copyholder and lens unit.

Lamp housings 10 are provided for supporting vapor type tubular lamp structures of a character well known in the art to provide illumination of a copyholder 11. Each housing is arranged so that the light is reflected thereby downwardly toward the copyholder in such a way that the light is reflected by documents on the copyholder toward the photographing unit for photographing. Each lamp housing 10 is slidably mounted on rails 12.

Rails 12 forming a substantially horizontal supporting frame are hingedly mounted at 13 on sections 14 pivotally mounted on rod 15 carried by bracket 16 secured on housing 2 below tubular member 3, as shown in Figs. 1 and 2. Brackets 17 and 18 are carried by rails 12 and sections 14, respectively. These brackets are provided with aligned projections formed with openings to receive pins 19 for holding sections 17 and 18 in alignment with rails 12 in the position shown in full lines in Fig. 2.

The opposite ends of rails 12 are provided with hinged connections 20 to straps 21. Each strap 21 extends upwardly in inclined relation from the outer ends of rails 12 to the upper end of housing 2 where they are provided with longitudinal slots 22 for receiving threaded bolts 23 carried by hinge brackets 24 mounted on the upper end of housing 2. A wing nut 25 threaded on each bolt 23 is adapted for manual operation to clamp the free ends of straps 21 against movement relative thereto for supporting the outer ends of rails 12 in horizontal position and in alignment with sections 14 in the manner shown in full lines in Figs. 1 and 2. This position of the lamp supporting structure is employed when photographs of documents are taken with the copyholder in the elevated position shown in Fig. 1.

When the copyholder is in a lowered position, pins 19 are removed from brackets 17 and 18 and wing nuts 25 are actuated to release straps 21 so that rails 12 and sections 14 may have hinging movement relative to each other into the position shown in dot and dash lines in Fig. 2 wherein sections 14 extend downwardly from supporting brackets 16 along the front face of housing 2. This lowers the position of rails 12 which are then supported in horizontal position by adjustment of straps 21 and the tightening of thumb screws 25 on bolts 23. This brings the lights in light housings 10 into a position where they are substantially the same distance from the copyholder plate as they are when it is supported in the elevated position shown in full lines in Figs. 1 and 2. In this way substantial uniformity of light intensity directed on the documents to be photographed is obtained. Suitable brackets 26 are used to suspend each light housing 10 from rails 12 and are provided with wing nuts for securing light housings 10 in any position of adjustment on rails 12 between the ends of the slots that receive the supporting portions of the brackets, as clearly shown in Figs. 1 and 3 of the drawings. This provides for adjustment of the lights in either the elevated position or lowered position to fully correspond with all adjustments of the copyholder. This also provides for adjusting the lamp housings on the rails in the elevated position of the rails for properly illuminating the copyholder in two positions thereof in producing photographic copies of documents as described in the aforementioned parent patent.

With this arrangement of adjustable photographic units, copyholder and light support, it will be seen that uniform intensity of lighting is obtained for each position of adjustment of the copyholder and the photographic unit so that uniform size reproductions may be made of several different sizes of documents or one document may be reproduced to provide three different sized copies. The operation of the photographic unit, copyholder and light supporting structure is so arranged that the adjustments are fixed for immediate manual operation of the several parts into any one of their positions of adjustment in a quick and convenient manner without using gauges.

The structure described provides for the mounting of the photographic unit and light supporting structure above the base on the housing so that the space around the copyholder is open and free for the operator to conveniently manipulate the documents to be copied and have ready access to all of the camera mechanism for convenient operation.

The invention claimed is:

1. In a document photographing camera having a base and a casing projecting upwardly therefrom, a light support comprising a lamp housing, a supporting frame slidably mounting said housing, sections hinged to one end of said frame and said casing respectively for suspending said frame from said casing for movement relative thereto into a plurality of selected positions, and straps connected to the opposite end of said frame and adjustably secured to said casing for cooperating with said sections in supporting said frame in substantially horizontal relation in each selected position.

2. In a document photographing camera having a base and a casing projecting upwardly therefrom, a light support comprising a lamp housing, a pair of rails slidably mounting said lamp housing, sections hinged at one end to said rails and at the opposite end to said casing, and straps hinged at one end to the ends of said rails opposite said sections and adjustably secured to said casing in spaced relation to said sections for cooperation in supporting said lamp housing in a substantially horizontal position in each selected position of adjustment.

3. In a document photographing camera having a copyholder movable into a plurality of positions in parallel relation with each other relative to a lens unit above said copyholder and adjustable on a support at one side of said copyholder, a light support comprising a lamp housing, a supporting frame mounting said housing, means hinged at opposite ends to said frame and support respectively for suspending said frame from said support for movement relative thereto into a plurality of selected positions, and means adjustably connecting the opposite end of said frame to said support for cooperating with said first mentioned means in supporting said frame in substantially horizontal relation in each selected position.

4. In a document photographing camera having a copyholder movable into a plurality of positions in parallel relation with each other relative to a lens unit above said copyholder and adjustable on a support at one side of said copyholder, a light support comprising a lamp housing, a supporting frame mounting said housing, sections hinged at opposite ends to said frame and support respectively and supporting said frame for movement into a plurality of parallel spaced positions on said support with said sections in different selected angular positions relative to said frame, means for holding said sections in each of said positions, and strap means for adjustably connecting the opposite end of the frame with said support for cooperation to support said frame in substantially horizontal relation in each selected position.

VICTOR C. HEYBOURNE.